(12) United States Patent
Van Wel

(10) Patent No.: US 8,856,494 B2
(45) Date of Patent: *Oct. 7, 2014

(54) SIMD PROCESSOR FOR PERFORMING DATA FILTERING AND/OR INTERPOLATION

(75) Inventor: Antonius A. M. Van Wel, Eindhoven (NL)

(73) Assignee: Intel Corporation, Santa Clara, CA (US)

( * ) Notice: Subject to any disclaimer, the term of this patent is extended or adjusted under 35 U.S.C. 154(b) by 332 days.

This patent is subject to a terminal disclaimer.

(21) Appl. No.: 13/348,358

(22) Filed: Jan. 11, 2012

(65) Prior Publication Data

US 2012/0124334 A1    May 17, 2012

Related U.S. Application Data

(63) Continuation of application No. 11/718,251, filed as application No. PCT/IB2005/053575 on Nov. 2, 2005, now Pat. No. 8,122,227.

(30) Foreign Application Priority Data

Nov. 3, 2004 (EP) .................................... 04105471

(51) Int. Cl.
G06F 7/38 (2006.01)
G06F 9/30 (2006.01)
G06F 9/38 (2006.01)

(52) U.S. Cl.
CPC ........ *G06F 9/30014* (2013.01); *G06F 9/30036* (2013.01); *G06F 9/3885* (2013.01); *G06F 9/3887* (2013.01); *G06F 9/30109* (2013.01); *G06F 9/30181* (2013.01)
USPC .............................................. 712/22; 712/21

(58) Field of Classification Search
None
See application file for complete search history.

(56) References Cited

U.S. PATENT DOCUMENTS

| 5,859,790 A | 1/1999 | Sidwell |
| 6,041,404 A | 3/2000 | Roussel et al. |
| 6,115,812 A | 9/2000 | Abdallah et al. |
| 6,212,618 B1 | 4/2001 | Roussel |

(Continued)

FOREIGN PATENT DOCUMENTS

| JP | 03-201172 A | 9/1991 |
| JP | 07-282237 A | 10/1995 |

(Continued)

OTHER PUBLICATIONS

Japanese Patent Office, Office Action in Japanese Application No. 2007-539681, (Aug. 21, 2012).

(Continued)

*Primary Examiner* — Jacob A Petranek
(74) *Attorney, Agent, or Firm* — Leydig, Voit & Mayer, Ltd.

(57) ABSTRACT

Data processing circuit containing an instruction execution circuit having an instruction set comprising a SIMD instruction. The instruction execution circuit comprises arithmetic circuits, arranged to perform N respective identical operations in parallel in response to the SIMD instruction. The SIMD instruction selects a first one and a second one of the registers. The SIMD instruction defines a first and second series of N respective SIMD instruction operands of the SIMD instruction from the addressed registers. Each arithmetic circuit receives a respective first operand and a respective second operand from the first and second series respectively. The instruction execution circuit selects the first and second series so they partially overlap. Positioning the operands is under program control.

16 Claims, 8 Drawing Sheets

(56) References Cited

U.S. PATENT DOCUMENTS

| | | |
|---|---|---|
| 6,397,235 B1 | 5/2002 | Van Eijndhoven et al. |
| 7,155,601 B2 | 12/2006 | Chennupaty et al. |
| 7,392,368 B2 | 6/2008 | Khan et al. |
| 7,558,816 B2 | 7/2009 | Saulsbury et al. |
| 2003/0097389 A1 | 5/2003 | Saulsbury et al. |
| 2004/0010321 A1 | 1/2004 | Morishita et al. |
| 2005/0125636 A1 | 6/2005 | Ford et al. |

FOREIGN PATENT DOCUMENTS

| | | |
|---|---|---|
| JP | 10-075362 A | 3/1998 |
| JP | H11-15801 A | 1/1999 |
| JP | 2001337814 A | 12/2001 |
| JP | 2002510418 A | 4/2002 |
| JP | 2003-337696 A | 11/2003 |
| WO | WO 99/48025 A2 | 9/1999 |

OTHER PUBLICATIONS

Japanese Patent Office, Office Action in Japanese Patent Application No. 2007-539681 dated Dec. 3, 2013 (10 pages).

Abel et al., "Applications Tuning for Streaming SIMD Extensions," Intel Technology Journal Q2, 1999 (13 pages).

Paver, N.C. et al., "Accelerating Mobile Video Applications Using Intel® Wireless MMX™ Technology," 2003 IEEE Workshop on Signal Processing Systems, XP010661016, pp. 207-212 (Aug. 27, 2003).

International Search Report in International Application No. PCT/IB2005/053575 dated Feb. 9, 2006.

SIMD PROCESSOR FOR PERFORMING DATA FILTERING AND/OR INTERPOLATION

CROSS-REFERENCE TO RELATED APPLICATION

This application claims the priority benefit of van Well, U.S. patent application Ser. No. 11/718,251, filed on Apr. 30, 2007, entitled "SIMD PROCESSOR FOR PERFORMING DATA FILTERING AND/OR INTERPOLATION," which claims the priority benefit of International PCT Patent Application Serial No. PCT/IB2005/053573, filed on Nov. 2, 2005, entitled "PROGRAMMABLE DATA PROCESSING CIRCUIT THAT SUPPORTS SIMD INSTRUCTION, the contents of which are expressly incorporated herein by reference in their entirety, including any references therein.

FIELD OF THE INVENTION

The invention relates to a programmable data processing circuit that has an instruction set that contains a SIMD (Single Instruction Multiple Data) instruction. The invention also relates to a method of performing interpolation of image data.

BACKGROUND

The use of SIMD instructions in the instruction set of the Intel Pentium® III processor is described in an article titled "Applications Tuning for Streaming SIMD Extensions, by James Abel, Kumar Balasubramanian, Mike Bargeron, Tom Craver and Mike Philpot, published in the Intel Technology Journal Q2, 1999 and publicly available on the Internet. This article will be referred to as Abel et al. In response to a SIMD instruction the processor treats the content of operand and result registers as a series of a plurality of numbers (for example four eight bit numbers in a thirty two bit register). The processor performs an operation that is specified by the SIMD instruction a number of times in parallel, each time using a different pair of numbers from the respective input registers as operands. The processor writes a combined result, which contains the respective numbers that result from these parallel-executed operations, to the result register specified by the instruction.

The availability of this type of SIMD instruction in the instruction set of a processor reduces the total number of instructions that have to be executed to perform a task wherein the same function has to be applied to large amounts of data, for example an image processing task, such as computer graphics processing, image compression or decompression. The reduction of the total number of instructions increases the speed with which such a task can be performed and reduces the power consumption involved with execution of such a task.

Alignment may cause problems when a task is executed using SIMD instructions. Alignment problems are a result of the way the operand data can be loaded from memory into registers that are used to supply operand data to the SIMD instructions. Typically operand data can only be loaded starting from addresses that are some integer multiple of a basic address distance. In most cases this is no problem, since the data that has to be processed (e.g. data for successive pixels) is stored successively starting from an aligned address, so that all data can be loaded by using successive load instructions. Abel et al. mention the alignment problem in the context of cache line splits. For special cases Abel et al. describe the use of a "moveups" instruction to support loading from unaligned addresses. In addition Abel et al. describe "shuffling" instructions, which can be used to rearrange numbers from registers. The need to use this type of instruction increases the number of instructions that must be executed.

One example of the alignment problem occurs during interpolation of image data, which involves combination of information for adjacent pixels. Abel et al. describe an interpolation approach wherein the parallelism of SIMD instructions is used to interpolate different color components of the same pixels together. In this case, a memory is used wherein sets of color components for successive pixels are stored successively.

Alternatively pixel data of one color component for adjacent pixels may be stored in successively adjacent memory locations. Preferably, it should be possible to use SIMD instructions to produce interpolated data for a plurality pixel locations in parallel. In this case, conventionally a first operand of the SIMD instruction should contain pixel data for a first plurality of adjacent pixels and a second operand should contain pixel data for a second plurality of pixels, whose pixel locations are offset to the locations of the pixels of the first plurality by a fixed offset (typically one pixel position). However, in this case at least one of the operands has to be loaded from an unaligned location, which increases the number of instructions that is needed.

SUMMARY OF THE INVENTION

Among others, it is an object of the invention to provide for a programmable processor with an instruction set that supports a reduction of the number of instructions that is needed to perform SIMD operations using operands that are stored in memory at address distances that are not an integer multiple of an alignment distance apart.

Among others, it is an object of the invention to provide for a programmable processor with an instruction set that supports a reduction of the number of instructions that is needed to perform SIMD operations using operands that are stored in memory at selectable non-aligned address distances.

The invention provides for a data processing circuit according to claim 1. According to the invention the data processing circuit has an instruction set that comprises a new type of SIMD instruction. In response to this SIMD instruction N arithmetic circuits (N=4 or N=8 for example) perform N respective identical operations in parallel. The SIMD instruction defines a first and second series of N respective SIMD instruction operands of the SIMD instruction from a first and a second register that are selected by the SIMD instruction. Each arithmetic circuit is arranged to receive a respective first operand and a respective second operand from the first and second series respectively, when executing the SIMD instruction. The instruction execution unit is designed to make it possible that the first and second series have a partial overlap. That is, that at least one, but not all of the operands from the first and second register are used by two arithmetic units. Typically, at least one of the first and the second series contains N operands part of which are taken from the first register and part of which are taken from the second register.

In one embodiment the SIMD instruction is applied to interpolation or filtering of signal samples, wherein the interpolated values for successive output sample positions are N SIMD results that are computed from respective pairs of operands for input sample positions. In this embodiment one operand for each successive pair overlaps with another operand of the preceding pair.

Preferably, the position of the first series within the first and second registers is programmably selectable. Thus, in the interpolation or filtering application the starting input sample position, for which the starting SIMD result is computed, can be programmably adjusted to individual sample positions even though the content of the operand registers has been loaded with aligned load operations. This is particularly useful if filtering or interpolation has to be performed for an array that is stored starting from an arbitrary location, for example from an arbitrarily positioned window. The second series preferably has a predetermined relative position with respect to the first series, for example offset by one operand position within the operand registers.

In one embodiment, the selection of the position is controlled by the operation code of the SIMD instruction. In another embodiment the position is controlled by operand data from a further register that is selected by the SIMD instruction. In this way a minimum of different instruction types is needed. Preferably, the further register also supplies coefficients for the filtering or interpolation, which are supplied to all arithmetic circuits in common.

In a further embodiment the data processing circuit comprises an operand distribution circuit coupled between a set of registers (typically a register file) and the arithmetic circuits. In this embodiment the operand distribution circuit is controlled by instruction data and/or operand data, for selecting a position of at least the first series of operands.

In a further embodiment the SIMD instruction has further operands that are supplied from predetermined positions in a further operand register, irrespective of the selected positions for the first and second operands. In the filtering or interpolation application, for example, the SIMD instruction preferably computes N sums of products. In this case N previous sums may be supplied from the further operand register. Alternatively such sums could be supplied from accumulator registers included with the arithmetic circuits, but this limits the flexibility with which the SIMD instruction can be used.

With a SIMD instruction of this type it is possible for example to compute an array of results r[i] like $$r[i]=s[i]+w1*a[i+\text{offset}]+w2*a[i+\text{offset}+1]$$

from an array of operand values a[ ] for a number of positions in parallel. By using the result r as input value s for another execution of this type of instruction, wherein other operands or offsets are used, interpolations or filtering operations that have larger support regions (regions of locations that affect the result) can be implemented in programs for the processing circuit with a minimum number of instructions.

In addition the instruction set preferably may also contain conventional SIMD instructions, in response to which the arithmetic circuits perform N identical operations in parallel, each arithmetic circuit using a respective first operand from a first one of the registers that is selected by the further SIMD instruction and a respective second operand from a second one of the registers that is selected by the further SIMD instruction.

BRIEF DESCRIPTION OF THE DRAWINGS

These and other objects and advantageous aspects of the invention will be described in more detail using non-limitative examples shown in the following figures.

DETAILED DESCRIPTION OF THE DRAWINGS

Figure 1:
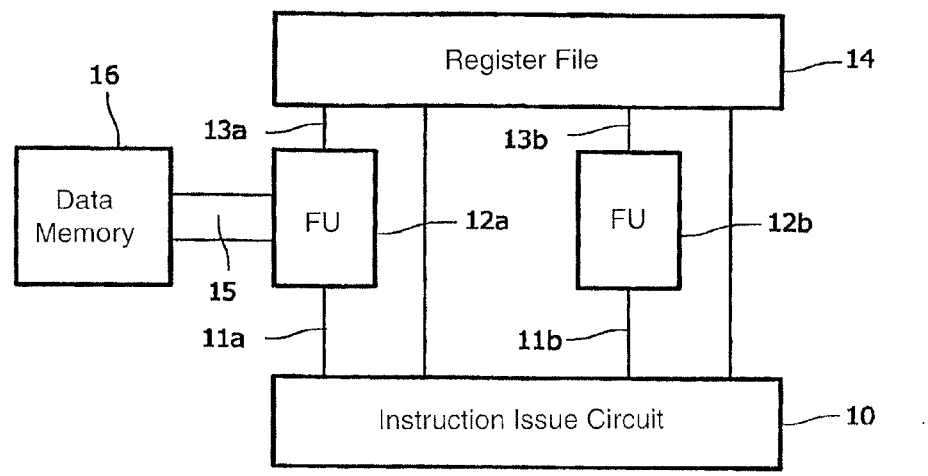
FIG. 1 shows a data processing circuit

FIG. 1 shows an example of a data processing circuit wherein the invention can be implemented. The data processing circuit contains an instruction issue circuit 10, a plurality of functional units 12a,b, a register file 14 and a data memory 16. Instruction issue circuit 10 has issue slot outputs 11a,b coupled to the functional units 12a,b and address ports of register file 14. Functional units 12a,b have operand/results communication lines 13a,b coupled to register file. A first functional unit 12a has an address/data interface 15 coupled to data memory 16.

In operation instruction issue circuit 10 issues instructions through issue slots 11a,b. Each instruction contains an operation code, which is supplied to a functional unit 12a,b, at least one operand register address, which is supplied to register file 14, and at least one result register address, which is supplied to register file 14. In response to the operand register address or addresses register file 14 reads operand data from an addressed register or addressed registers and supplies this operand data to the functional unit 12a,b that executes the instruction. In response to the operation code the functional unit 12a,b performs a selected operation using the operand data as input. The functional unit 12a,b writes the result or results of the operation as result data to register file 14 which stores the result data into the register or registers addressed by the result register address or addresses.

It should be emphasized that the structure of the data processing circuit of the figure is merely one example and that many other structures may be used. Although a particular architecture of processing circuit has been used to illustrate the invention, it should be understood that the processing circuit is but one example of a processing circuit that may be used to implement the invention and that in any case only a minimum number of details is shown. For example, although a processing circuit with two issue slots 11a,b and two functional units 12a,b is shown, it should be understood that a greater or smaller number of issue slots and/or functional units may be used. As another example, although no mention is made of pipelining for the sake of simplicity, it should be understood that typically pipelining will be so that different part of processing of different instructions may overlap and different parts of an instruction may be issued at different times. Furthermore, although separate functional units are shown coupled to separate issue slots, it should be understood that the functions of these functional units may be combined into a single functional unit, or that different functional units may be coupled to the same issue slot, so that one or more of these functional units become active when they receive appropriate instructions. Furthermore, although a single register file 14 is shown for the sake of clarity, it should be understood that in practice the register file may represent any set of registers, comprising for example a plurality of register files, possibly with registers of mutually different bit width. Different fields in the issue slots may address different ones of these register files. Furthermore, although single lines are shown to indicate connections between different parts, it will be understood that each line generally stands for a plurality of conductors for supplying a plurality of bits in parallel.

First functional unit 12a is a memory access unit which responds to operation codes by performing access operations to data memory 16. For example, in response to a read operation code, functional unit 12a, may supply an address and a read control signal to memory, receive back data that the memory has read from the address and write the data to register file 14. As another example in response to a write operation code, functional unit 12a, may supply an address, write data and a write control signal to memory, the write data being operand data received from register file 14. As a result data memory 16 will store the write data at the location addressed by the address. Typically, the memory access unit supports fast load and/or store instructions that are able to load data into registers only starting from selected addresses, which are called aligned addresses, so that the distance between successive aligned addresses corresponds to the number of memory locations that can be loaded into a single register together.

Second functional unit 12b includes an arithmetic processor that is capable of executing various SIMD (Single Instruction Multiple Data) instructions.

Figure 2:
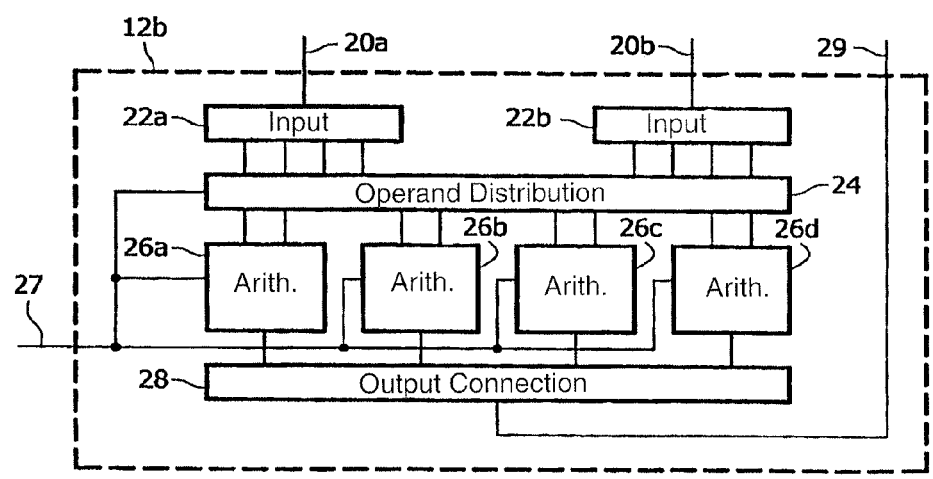
FIG. 2 shows part of a functional unit

FIG. 2 shows an example of an embodiment of such an arithmetic processor. In this example functional unit 12b has two operand inputs 20a,b input connections 22a,b, an operand distribution circuit 24, a plurality of arithmetic circuits 26a-d and output connection 28 and a result output 29. Typically, inputs 20a,b each contain a plurality of conductors coupled functionally in parallel to register file 14 (not shown). Thirty two or sixty four conductors may be used in parallel for example for each input 20a,b. Input connections 22a,b need not correspond to actual circuits, but are merely shown to indicate that inputs 20a,b can be treated as subdivided into a plurality of operands. A thirty-two bit input 20a,b may be subdivided into four operands of each eight bits for example, or a sixty four bit input 20a,b may be subdivided into four operands of each sixteen bits or eight operands of each eight bits for example. Typically, each input 20a,b represents a plurality of conductors in parallel, which can be split into groups for respective operands that are fed to inputs of operand distribution circuit 24.

Operand distribution circuit 24 has outputs coupled to respective inputs of arithmetic circuits 26a-d. Arithmetic circuits 26a-d have outputs coupled to output connection 28, which in turn has an output coupled to result output 29. Output connection 28 is also shown merely to indicate that output 29 can be treated as subdivided into a plurality of results. Typically, the output of each arithmetic circuits 26a-d represents a plurality of conductors in parallel, which can be combined into an output 29. Thirty-two or sixty-four conductors may be used in parallel for example for output 29. A thirty two bit output 29 may be subdivided into four results of each eight bits from respective arithmetic circuits 26a-d for example, or a sixty four bit output 29 may be subdivided into four results of each sixteen bits from respective arithmetic circuits 26a-d or eight operands (not shown) of each eight bits from respective arithmetic circuits 26a-d for example.

An input 27 for receiving the operation code from instruction issue circuit 10 (not shown) is coupled to each of the arithmetic circuits 26a-d and to operand distribution circuit 24. For a SIMD operation, each arithmetic circuits 26a-d responds by performing the same operation on its input operands. For the execution of conventional SIMD instructions, operand distribution circuit 24 is arranged to respond to operation codes that select such conventional SIMD instructions by supplying operands from respective positions in a first input 20a to first inputs of arithmetic circuits 26a-d and corresponding operands from respective positions in second input 20b to first inputs of arithmetic circuits 26a-d.

Figure 3:
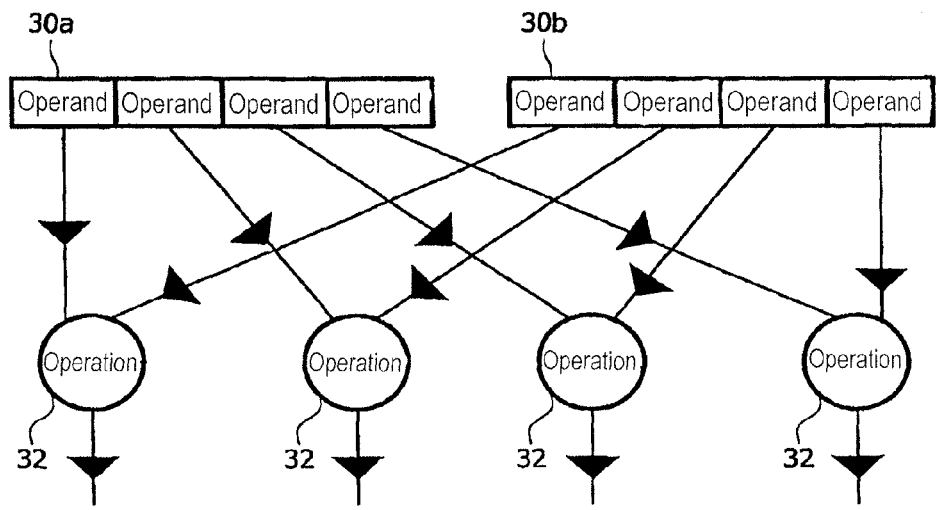
FIG. 3 shows data flow of a conventional SIMD instruction

FIG. 3 illustrates the data flow for such a conventional SIMD instruction. Herein the inputs 30a,b from respective registers are shown divided into fields that correspond to respective operands. Circles 32 represent operations and arrows between the fields and the operations symbolize data flow. This SIMD instruction could for example be a vector ADD instruction, with an assembly language representation like

ADDVECTOR R1, R2, R3

Herein, "ADDVECTOR" represents the operation code, which identifies the operation that must be executed, R1 and R2 represent the addresses of registers, each with a content that will be treated as a plurality of operands, the instruction being executed by performing a plurality of additions, the first addition adding operands from a first position in the registers addressed by R1 and R2, the second addition adding operands from a second position in the registers addressed by R1 and R2 etc. R3 represents the address of a register wherein a plurality of resulting sums will be stored in response to the instruction. Of course similar conventional SIMD instructions are possible for other operations, like subtraction, multiplication etc.

SUBVECTOR R1, R2, R3

MULVECTOT R1, R2, R3

Figure 4A:
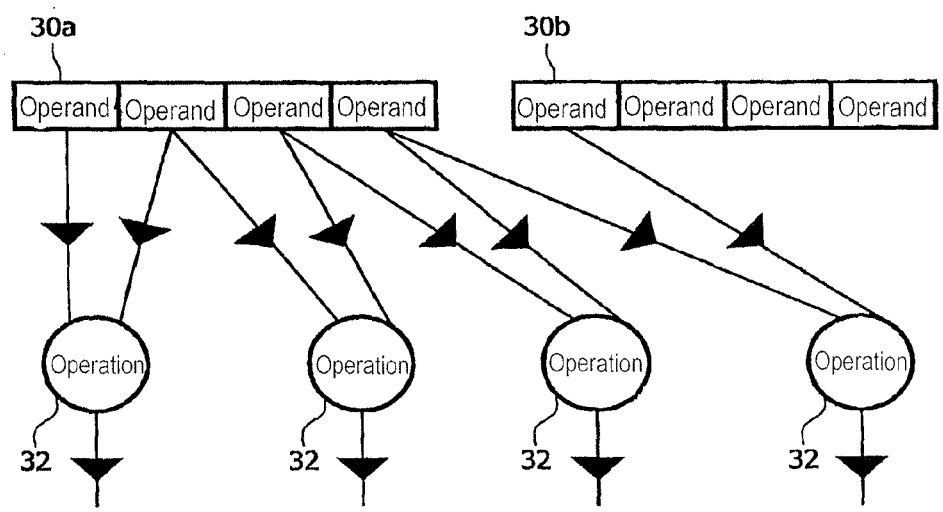
FIG. 4a-c show data flow of novel SIMD instructions

FIG. 4a illustrates the data flow for an example of SIMD instruction according to the invention. In this example an operation is performed using operands from a first and second field of the first input 30a, the same operation is performed using operands from the second and a third field of the first input 30a, the same operation is performed using operands from the third and a fourth field of the first input 30a and the same operation is performed using operands from the fourth field of the first input 30a and a first field of the second input 30b. The SIMD instruction may be an addition instruction for example

ADDADJACENT R1, R2, R3

Herein operands from pairs of adjacent positions in the register addressed by R1 are added, and the register addressed by R2 is treated as an extension of the register addressed by R1. The results of the additions are stored in the register addressed by R3. Of course other instructions for other operations are possible, such as subtractions, multiplications, multiply accumulate (MAC) operations etc. for operands from pairs of adjacent locations in a register

SUBADJACENT R1, R2, R3

MULADJACENT R1, R2, R3

MACADJACENT R1, R2, R3

Operand distribution circuit 24 implements the distribution of the operands. In response to an operation code from input 27 that selects a SIMD instruction of the conventional type operand distribution circuit 24 transfers the operands to arithmetic circuits 26a-d according to the data flow of FIG. 3. In response to an operation code from input 27 that selects a SIMD instruction of the new type operand distribution circuit 24 transfers the operands to arithmetic circuits 26a-d according to the data flow of FIG. 4a.

Figure 4B:
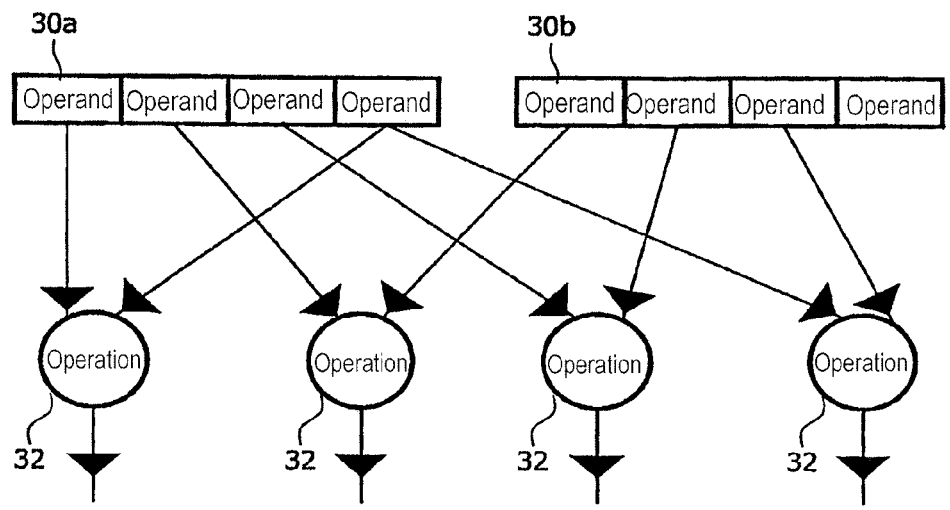

It should be appreciated that the invention is not limited to data flow of the type shown in FIG. 4a. In response to other instructions operand distribution circuit 24 may provide the data flow shown in FIG. 4b or 4c. FIG. 4b shows the response to the operation code of a SIMD instruction wherein the arithmetic circuits 26a,b receive their first operand from the first, second, third and fourth field of the first input respectively and a second operand from the fourth field of the first input, and the first, second and third field of the second input respectively. Such an instruction could have an assembly language representation like ADD14 R1, R2, R3 or MAC14 R1, R2, R3 etc.

Herein the operation code ADD14 or MAC14 denotes the operation and the position of the first operand in the register addressed by R1.

Figure 4C:
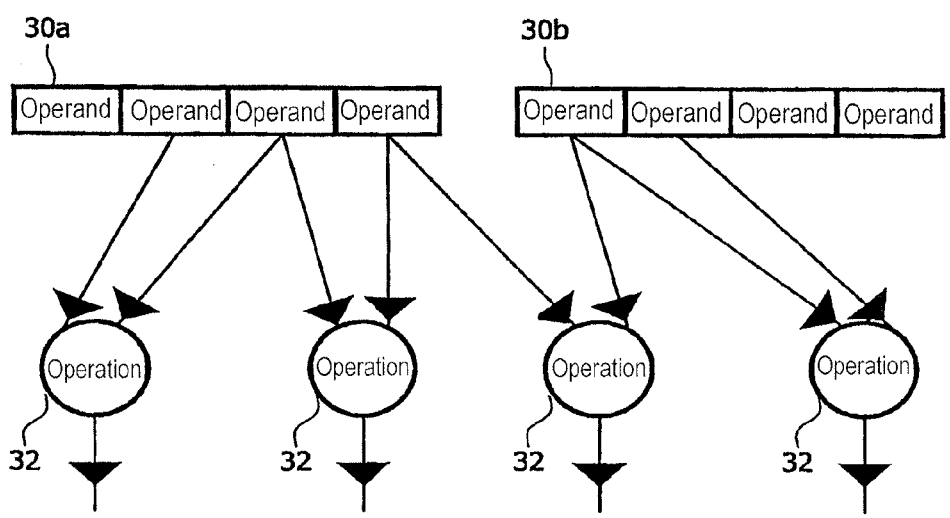

FIG. 4c shows the response to the operation code of a SIMD instruction wherein the arithmetic circuits $26a,b$ receive their first operand from the second, third and fourth field of the first input and from the first filed of the second input respectively and a second operand from the third and fourth field of the first input, and the first and second field of the second input respectively.

Such an instruction could have an assembly language representation like

ADD23 R1, R2, R3 or MAC23 R1, R2, R3 etc.

Of course, there need not be operation codes for the same operation all combinations of positions: it may suffice to provide only certain combinations that are frequently needed in programs In the examples given thus far, operand distribution circuit 24 performs the selection of the operands from the fields under control of the operation code from instruction issue circuit 10. Alternatively, the selection may be performed under control of a further operand received from register file 14, or under control of a combination of such an operand and the operation code from instruction issue circuit 10.

Figure 5:
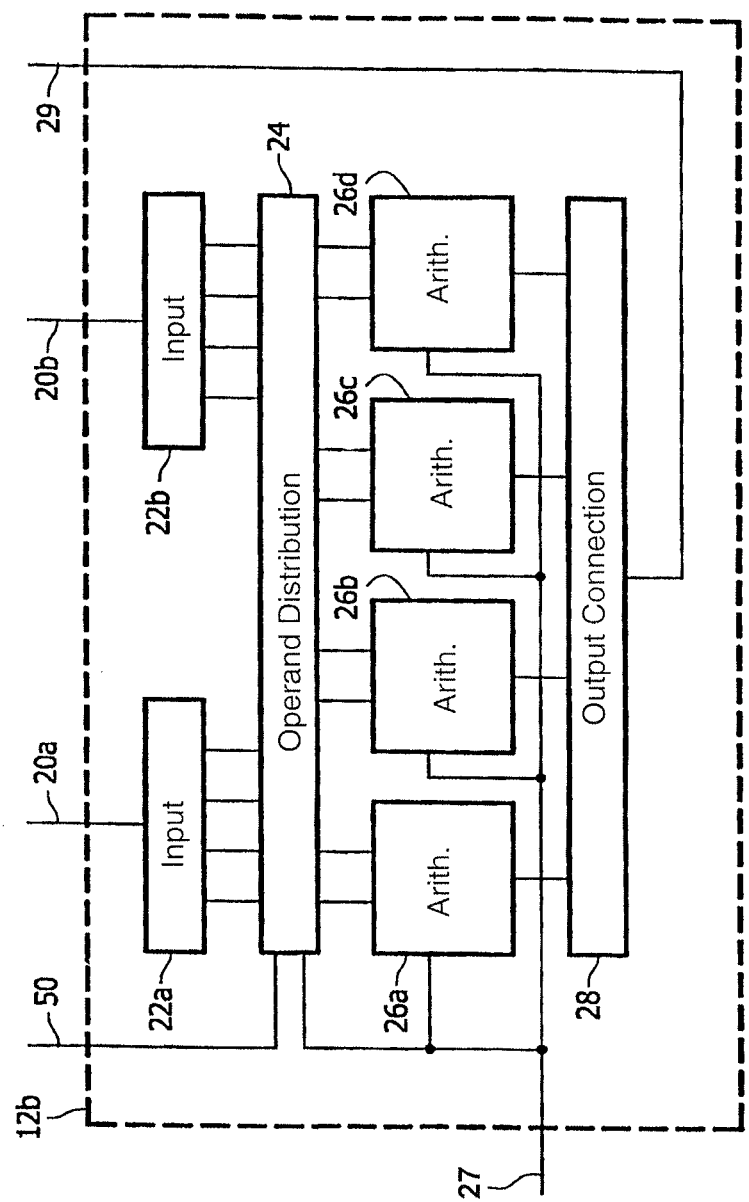
FIG. 5 shows a functional unit with simplified data flow

FIG. 5 shows an embodiment of a functional unit $12b$, which has a further operand input 50, coupled to register file 14 (not shown). In this embodiment the instruction issued by instruction issue circuit 10 contains a further operand register selection address that instruction issue circuit 10 supplies to register file 14. The assembly language representation of an example of such an instruction is for example ADDSUCCESSIVE Rp,R1,R2,R3

Herein a register address Rp designates the address of a register that provides the further operand.

In this embodiment operand distribution circuit 24 performs the selection of operands under control of a combination of a further operand from the further operand input 50 and the operation code from instruction issue circuit 10. In this embodiment the operation code may be used to indicate whether a conventional flow (as shown in FIG. 3) is required or not, and if not the further operand from further operand input 50 controls which operand selection is used.

In one example, the further operand selects a first field for an operand from first input $30a$ and operand distribution circuit 24 selects four first operands for respective arithmetic circuits $26a$-$d$ starting from that field and following fields in the first input $30a$ and continuing from a first field of the second input $30b$. In this case operand distribution circuit 24 may be arranged to select four second operands for respective arithmetic circuits $26a$-$d$ starting from a next field that follows the selected field in the first input $30a$ and following fields in the first input $30a$ if any, and continuing from a first field of the second input $30b$. In this way the data flow of FIG. 4c may be selected for example. In this case the further operand may have one of four values, 0, 1, 2, 3 for example, each value indicating a different position. In this case, two bits of the further operand suffice for this purpose.

In another example, operand distribution circuit 24 may be arranged to make independent selections of the positions of two starting operands under control the further operand, or from two further operands. Thus for example, the further operand may contain two fields, a first one for selecting a first field in the first or second input and a second one for selecting a second field in the first or second input. In this case operand distribution circuit 24 may be arranged to select, four first operands for respective arithmetic circuits $26a$-$d$ starting from the first field in the first input $30a$ if any, and continuing from a first field of the second input $30b$. Similarly operand distribution circuit 24 may be arranged to select four second operands for respective arithmetic circuits $26a$-$d$ starting from the second field in the first input $30a$ if any, and continuing from a first field of the second input $30b$. In this way, the data flow of FIG. 4b may be realized if the first field of the further operand selects the first field of the first input and the second field of the further operand selects the fourth field of the first input. In this case, twice two bits of the further operand for the respective fields suffice for this purpose.

In a yet further embodiment, the further operand may contain selections fields for independent selection of each of the operands. Thus, if each register is treated as containing N operands, the further register may contain 2N fields of each $^2$ log N bits to select the operands. However, it has been found that for practical programs a reduced selection suffices, selecting for example only one offset for the first operand, of the first operation (the remaining operands being selected from successive positions) or selecting only two offsets, for the first and second operand of the first operation (the remaining operands being selected from successive positions).

Figure 6:
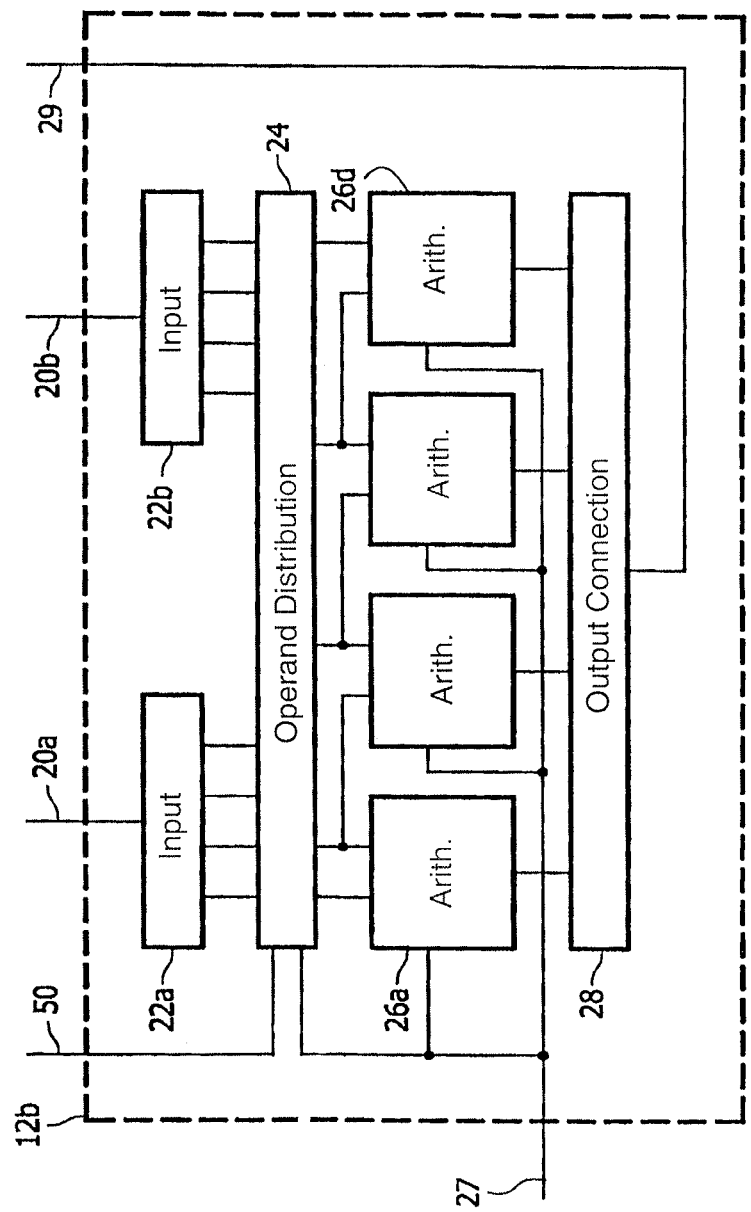
FIG. 6 shows a functional unit with a further operand input

FIG. 6 shows part of a simplified functional unit that may be used when only restricted operand selection is used, wherein the second operand of each arithmetic circuit but the last arithmetic circuit $26d$ serves as first operand for a next arithmetic circuit. In this way operand distribution circuit 24 can be considerably simplified. Operand distribution circuit 24 may be implemented as a set of multiplexers for example, each for selectably coupling a selectable input to a respective operand input of an arithmetic circuit $26d$. However, other implementations of the invention are possible. For example a plurality of arithmetic circuits $26a$-$d$ may be provided for executing one type of instruction only, which uses operand data from predetermined fields from the registers that are addressed in an instruction of this type. In this case the inputs of the arithmetic circuits may be hardwired to receive predetermined parts of the content of the addressed registers, the arithmetic circuits being activated to write the results to a result register in response to an operation code that indicates that the instruction is of this type. In this case, operand distribution circuit 24 need not comprise more than the relevant wiring connections.

Figure 7:
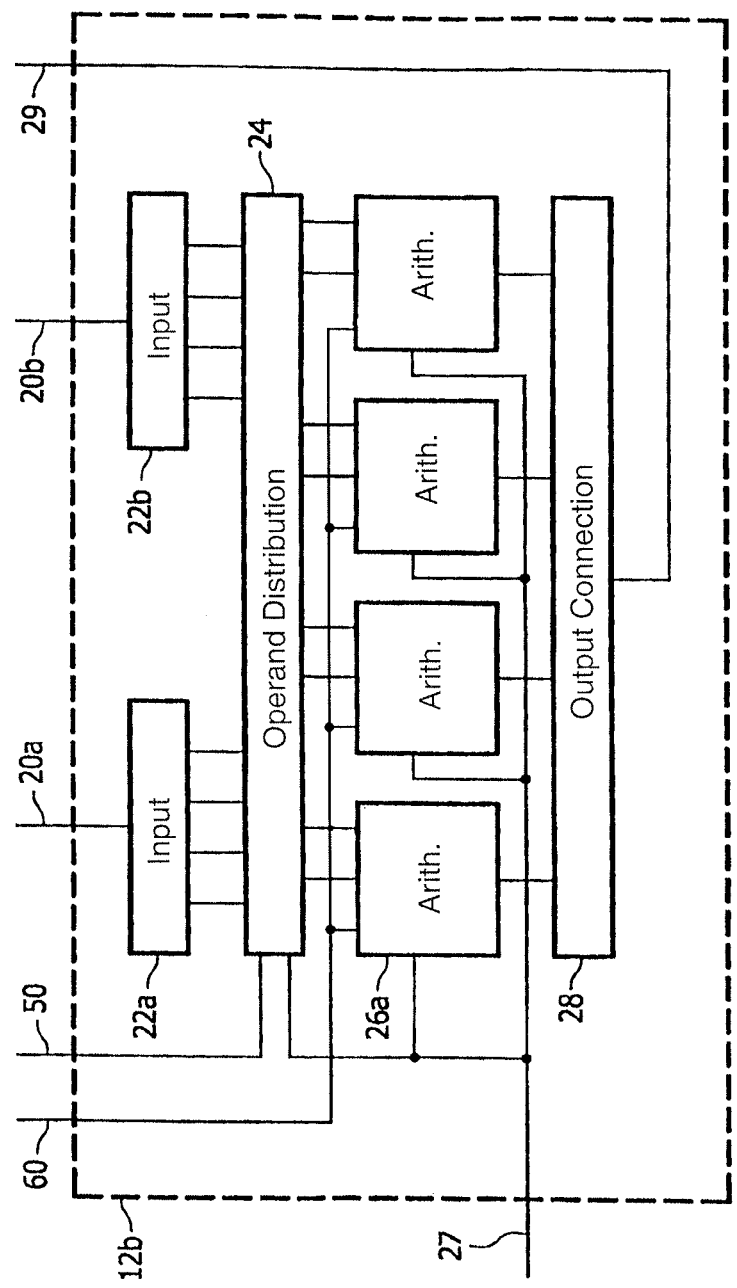
FIG. 7 shows a functional unit an operand input for a common operand

FIG. 7 shows a further embodiment wherein a further input 60 is provided on which further operand data may be supplied that is fed to all arithmetic circuits $26a$-$d$ in common. In this case an instruction for the functional unit may have an assembly language representation like OPCODE Rp, Rc, R1, R2, R3

Wherein Rc denotes the address of a register with a further operand (or operands) in common for arithmetic circuits $26a$-$d$. The further operand data may represent filter coefficients for example. In one embodiment such an instruction may be used to implement the calculation of $$b[0]=w0*a[\text{offset}+0]+w1*a[\text{offset}+1]$$

$$b[1]=w0*a[\text{offset}+1]+w1*a[\text{offset}+2]$$

$$b[2]=w0*a[\text{offset}+2]+w1*a[\text{offset}+3]$$

$$b[3]=w0*a[\text{offset}+3]+w1*a[\text{offset}+4]$$

Herein a[0] a[1], a[2], a[3], a[4] etc. represent operand data stored in respective fields in the registers addressed by R1 and R2 (the register addressed by R2 being treated as an extension of the register addressed by R1). The operand "offset" is obtained from the register addressed by Rp and indicates a starting field position in the registers addressed by R1 and R2. Each arithmetic circuit 26a-d computes a respective one of b[0], b[1], b[2] and b[3] and these results are written to respective fields (parts) of the register addressed by R3.

In this embodiment the register addressed by Rc contains the coefficients w0, w1 that are supplied to each of the arithmetic circuits 26a-d. In another embodiment, the operands that control operand distribution circuit 24 and the operands that are supplied to the arithmetic circuits 26a-d in common may be taken from a single further operand. For example, in case of registers with thirty-two bits, two eight-bit coefficients and a two bit offset selection may be supplied from respective fields in a single operand:

OPCODE Rs, Rpc, R1, R2, R3

Herein, it is assumed that position and coefficient information is supplied combined in one operand from a register addressed by Rpc. The fields are selected by the content of Rs.

Figure 8:
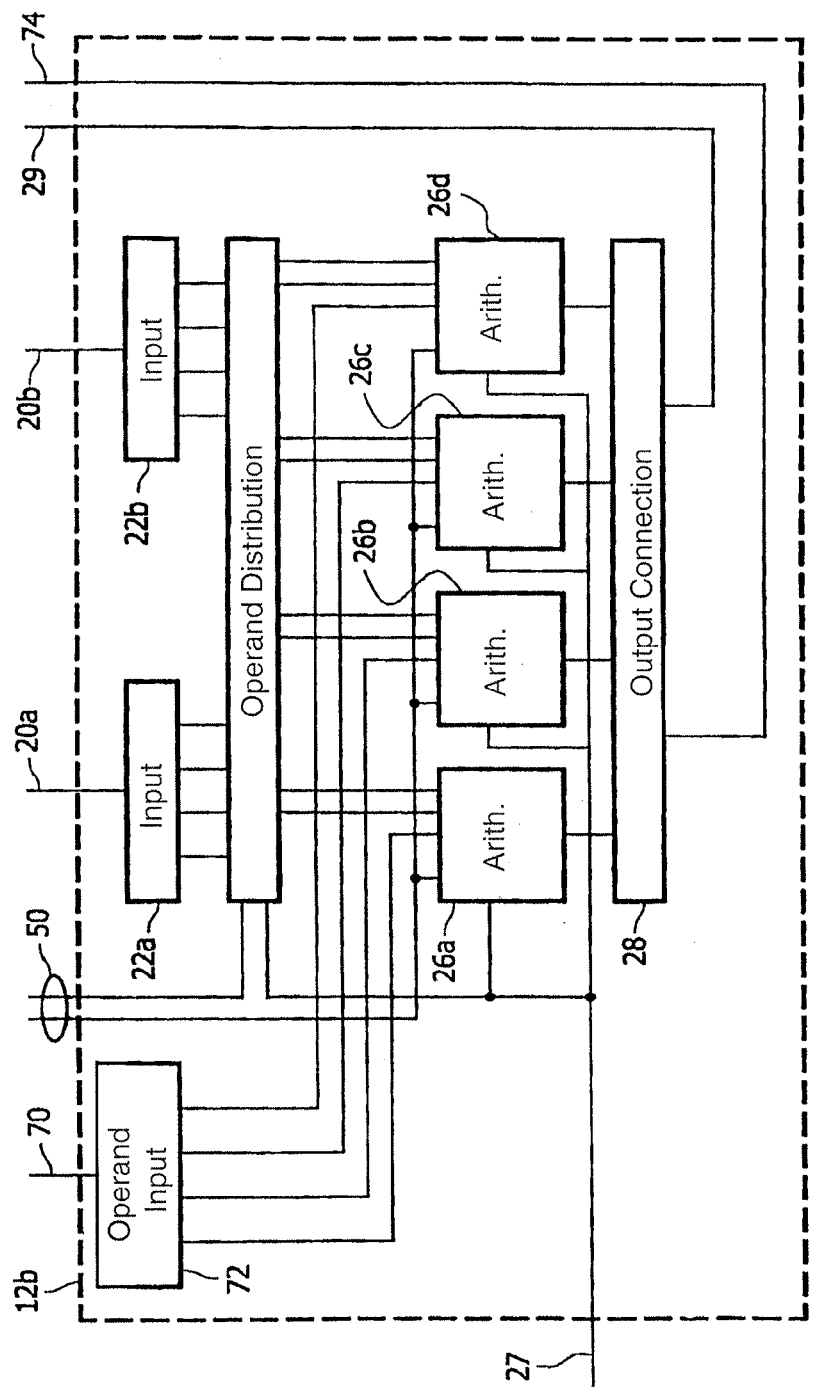
FIG. 8 shows a functional unit with a summand input

FIG. 8 shows a further embodiment of the functional unit, wherein an additional operand connection 70 has been added, coupled to an input 72 that feeds respective operands from the additional operand connection 70 to respective ones of arithmetic circuits 26a-d. Furthermore, an additional result connection 74 has been added to output connection 28. This functional unit may be used for example to perform the following computations in response to an instruction $b[0]=s[0]+w0*a[\text{offset}+0]+w1*a[\text{offset}+1]$ $b[1]=s[1]+w0*a[\text{offset}+1]+w1*a[\text{offset}+2]$ $b[2]=s[2]+w0*a[\text{offset}+2]+w1*a[\text{offset}+3]$ $b[3]=s[3]+w0*a[\text{offset}+3]+w1*a[\text{offset}+4]$ This is a multiply-add instruction using operands from successive adjacent fields in the registers.

Figure 9:
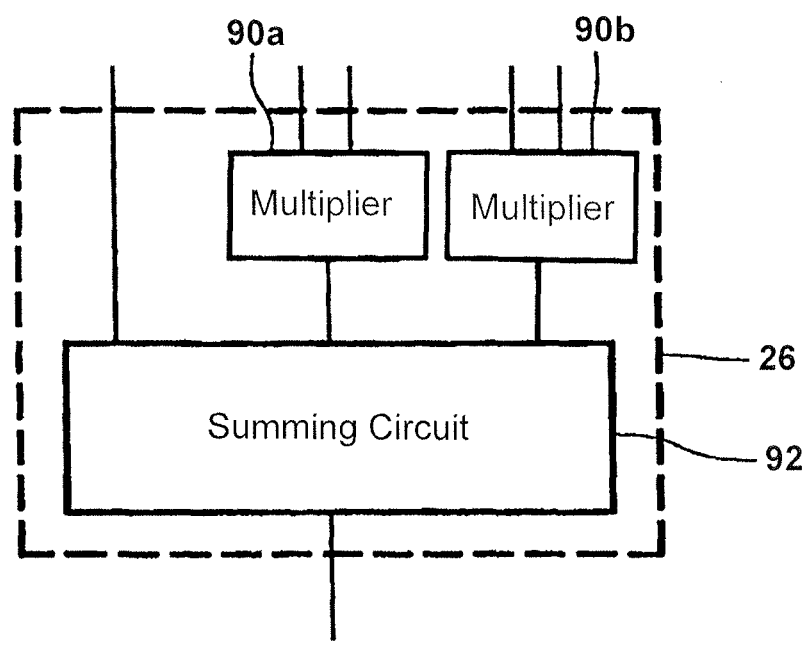
FIG. 9 shows an arithmetic circuit

FIG. 9 shows an arithmetic circuit 26 that may be used for this purpose, containing multipliers 90a,b for computing the products w0*a[ . . . ] and w1*a[ . . . ] and a summing circuit 92.

In this example the functional unit outputs respective sums of a summand s[ . . . ] and the products w0*a[ . . . ] and w1*a[ . . . ]. The summands s[ . . . ] for the respective arithmetic circuits 26a-d are taken from predetermined fields of a register that is addressed by Rs the common coefficients are taken from a register that is addressed by Rpc and the operands a[ ] are taken from respective fields of the registers that are addressed by R1 and R2. The positions from which these operands are derived are controlled by offset information from the register that is addressed by Rpc. The results from the different arithmetic circuits 26a-d are combined and written to the register addressed by R3.

Preferably, a register (R3) wherein the result is stored has at least twice the width (the number of bits) of that of the registers (R1, R2) that are used to supply the operands a[ . . . ]. This is used to account for the fact that 2M bits are needed to represent a product of two M bit numbers without loss of precision. If accumulation is used (addition of a number to the product) even more bits may be needed, e.g. 2M+2 bits. The width may be chosen according to the relevant width of the results. Thus, for example, if four eight-bit operands a[ . . . ] (M=8) are supplied from thirty two-bit input registers (R1, R2), then preferably a sixty-four bit output register (R3) is used to store four sixteen bit results (M=16). In addition, in response to the instruction, the results are preferably also stored with truncated precision in a further result register R4, which has the same width as the input registers (R1, R2). In this further result register only part of each result b[ . . . ] is stored, for example only the most significant half of the bits, or only the most significant relevant half of the bits, for example bits from a number of predetermined positions from each result, say bits 4-12. Preferably, the register (Rs) used for supplying the sums s[ . . . ] also has twice the width (the number of bits) of that of the registers (R1, R2) that are used to supply the operands a[ . . . ]. This may be used for an implementation of multi-dimensional interpolation (e.g. 2-dimensional image interpolation) using the following instructions MAC Rs, Rpc1, R1, R2, R3, R4

MAC R3, Rpc2, R1', R2', R3, R4

Herein it is assumed that the register addressed by R1 contains N (N=4 for example) pixel values for adjacent pixel positions along an image line (e.g. pixel values p[i,j], p[i+1,j], p[i+2,j] p[i+3,j], the integer j referring to the line and i referring to a starting pixel position), the register addressed by R2 containing pixel values for positions following those of R1 (e.g. pixel values p[i+4,j], p[i+5,j], p[i+6,j] p[i+7,j]). The register addressed by Rpc1 contains two coefficients w00, w01. Similarly, it is assumed that R1' and R2' each contain N (N=4 for example) pixel values for adjacent pixel positions along a next image line, adjacent to the image line of R1 and R2 (e.g. pixel values p[i,j+1], p[i+1,j+1], p[i+2,j+1] p[i+3,j+1] and p[i+4,j+1], p[i+5,j+1], p[i+6,j+1] p[i+7,j+1] respectively). The register addressed by Rpc2 contains two coefficients w10, w11. The register addressed by Rs contains zero values. In this case, after the two operations the result in the register addressed by R3 will contain $b[0]=w00\,p[i+0,j]+w01\,p[i+1,j]+w10\,p[i+0,j+1]+w11\,p[i+1,j+1]$ $b[1]=w00\,p[i+1,j]+w01\,p[i+2,j]+w10\,p[i+1,j+1]+w11\,p[i+2,j+1]$ $b[2]=w00\,p[i+2,j]+w01\,p[i+3,j]+w10\,p[i+2,j+1]+w11\,p[i+3,j+1]$ $b[3]=w00\,p[i+3,j]+w01\,p[i+4,j]+w10\,p[i+3,j+1]+w11\,p[i+4,j+1]$ Thus, four four-pixel interpolations have been performed by executing two instructions. To interpolate a complete image this may be repeated in combination with loading of successive groups of pixels.

Preferably, moreover the functional unit supports at least an operand that specifies an offset, for example as part of the operands in the registers addressed by Rpc1 and Rpc2. In this way, the position of the starting pixel values p[i+0,j] and p[i+0,j+1] on the registers addressed by R1, R2 and R1', R2' can be selected under control of the program. This makes it possible to produce results for pixel values that are stored starting from arbitrary addresses in data memory, without further realignment in combination with load operations that used aligned addresses. Thus for example a series of pixels along a line can be processed using the following instructions

LOAD A, R1

INC4 A

LOAD A, R2

LOAD A', R1'

INC4 A'

LOAD A', R2' repeat

```
MAC Rs, Rpc1, R1, R2, R3, R4

INC4 A

LOAD A,R1

MAC R3, Rpc2, R1', R2', R3, R4

STORE A", R4

INC4 A"

INC4 A'

LOAD A',R1'

MAC Rs, Rpc1, R2, R1, R3, R4

INC4 A

LOAD A,R2

MAC R3, Rpc2, R2', R1', R3, R4

STORE A", R4

INC4 A"

INC4 A'

LOAD A',R2'
```

Herein pixel values from groups of adjacent memory locations are loaded into the registers addressed by R1 and R2 and R1' and R2' and used to produce groups of four interpolated results (in the MAC instructions). Here the offset of the first pixel that is used from the registers R1, R2 that is used to produce the first interpolated result is controlled by the register addressed by Rpc1. Next pixel values from a next group of adjacent memory locations is loaded into R1 (and R1'), the role of R1 and R2 being exchanged in the interpolation instructions (MAC). After this the loop repeats.

As should be appreciated the memory access instructions (LOAD and STORE) in this program all use aligned addresses. Thus, interpolation of pixel data that is stored starting from unaligned starting addresses is facilitated. This increases speed especially if interpolation is required in relatively small windows that start at arbitrarily selectable positions in the image.

Although an application of the invention has been illustrated for two-dimensional image processing, it should be appreciated that the invention is not limited to this application. The invention may also be applied to one-dimensional array processing or three and higher dimensional array processing. Furthermore, although an application to a SIMD instruction that involves summing of products of pixels and coefficients has been illustrated, it should be understood that other instructions may be used.

According to the invention the processing circuit is arranged to include certain novel instructions in its instruction set. As is well known a specification of the instruction set of a processor is generally sufficient to inform the skilled person what implementations can be chosen to realize the processor. The instruction set defines each different type of instruction that can be included in a machine program for the processor (an instruction, as the word is used herein, refers to the "atoms" of the machine program, the smallest units into which the program can be split without ending up with fragments that are not instructions themselves). The instruction set of the processing circuit according to the invention comprises an instruction that makes the processing circuit perform a SIMD operation, in the sense that a plurality of results are produced by executing the same type of operation in parallel, using operands from registers that each contain a plurality of potential operands. The operations that are executed in parallel use overlapping series of operands. Preferably, the instruction has a further operand that indicates the position in the registers from which the operands must be obtained; alternatively, different operation codes indicate different positions.

The invention claimed is:

1. A data processing circuit, comprising:
   a set of registers that comprises instruction selectable registers, each register containing a plurality of N parts suitable for storing respective SIMD instruction operands and/or results;
   an instruction execution circuit having an instruction set that comprises a SIMD instruction, the instruction execution circuit comprising a plurality of arithmetic circuits, arranged to perform N respective identical operations in parallel in response to the SIMD instruction, the SIMD instruction defining a first and a second series of N respective SIMD instruction operands of the SIMD instruction from a first register and a second register from the set of registers that are selected by the SIMD instruction, each arithmetic circuit being arranged to receive a respective first operand and a respective second operand from the first and second series respectively, when executing the SIMD instruction,
   wherein the instruction execution circuit is arranged for selecting the first and second series so that the first and second series partially overlap,
   wherein at least a first and a second arithmetic circuit of the plurality of arithmetic circuits commonly use an operand from the first and/or the second series, and
   wherein at least two different operands from the operand registers of the plurality of arithmetic units overlap in the first and second series of operands.

2. The data processing circuit according to claim 1, wherein the instruction execution circuit is arranged to extract at least the second series of operands from respective parts of both the first register and the second register from the set of registers.

3. The data processing circuit according to claim 1, wherein the instruction execution circuit is arranged to select at least a position of the first series within the first register and the second register from the set of registers under program control.

4. The data processing circuit according to claim 3, comprising:
   an instruction issue circuit coupled to the instruction execution circuit and the set of registers for supplying instruction data to select the SIMD instruction and to select the first register and the second register from the set of registers, respectively;
   an operand distribution circuit coupled between the set of registers and the arithmetic circuits, and controlled by the instruction data and/or operand data, for selecting a position of the first series, selectable positions of the first series including at least one position wherein the first series extends over parts of both the first register and the second register from the set of registers.

5. The data processing circuit according to claim 3, wherein the SIMD instruction selects a further register, and the instruction execution circuit is arranged to control the position of the first series under control of information from the selected further register.

6. The data processing circuit according to claim 3, wherein the instruction execution circuit is arranged to select the second series from a predetermined relative position with respect to the first series.

7. The data processing circuit according to claim 1, wherein the SIMD instruction selects a further register comprising a plurality of parts for storing respective SIMD instruction operands, the instruction execution circuit coupling parts from predetermined positions within the further register to respective predetermined ones of the arithmetic circuits to supply further operands.

8. The data processing circuit according to claim 7, wherein the instruction execution circuit is arranged to select at least a position of the first series within the first register and the second register from the set of registers under program control, so that the predetermined positions are not affected by the position of the first series selected under program control.

9. The data processing circuit according to claim 7, wherein each of the arithmetic circuits is arranged to compute a sum of an operand from the further register and respective products of operands from the first and second series with coefficients that are common to all of the arithmetic circuits.

10. The data processing circuit according to claim 9, wherein the SIMD instruction selects an additional register, the coefficients being supplied to the arithmetic circuits from the additional register.

11. The data processing circuit according to claim 10, wherein the instruction execution circuit is arranged to select at least a position of the first series within the first register and the second register from the set of registers, under control of data from the additional register selected by the SIMD instruction.

12. The data processing circuit according to claim 9, programmed with a program that contains an SIMD instruction to perform pixel interpolation for groups of pixels in parallel.

13. The data processing circuit according to claim 1, wherein the instruction set contains a further SIMD instruction, the instruction execution circuit being arranged to make the arithmetic circuits perform N identical further operations in parallel in response to the further SIMD instruction, each arithmetic circuit using a respective first operand from a first register from the set of registers that is selected by the further SIMD instruction and a respective second operand from a second register from the set of registers that is selected by the further SIMD instruction.

14. A method of executing a computer program on a programmable instruction processing circuit that has an instruction set that comprises a SIMD instruction, the computer program comprising at least one instance of the SIMD instruction, the method comprising:
  retrieving, in response to the SIMD instruction, a content of a first and second register that are selected by the SIMD instruction, each register storing a plurality of N respective SIMD operands, the SIMD instruction defining a first series and a second series of N respective operands among the operands from the first and second register, the first and the second series having an overlap;
  performing N respective identical operations in parallel, in response to the SIMD instruction, each operation using a respective first operand and a respective second operand from the first and the second series respectively,
  wherein at least a first and a second operation of the N respective identical operations use a common operand from the first and/or the second series, and
  wherein at least two different operands from the operand registers of the plurality of arithmetic units overlap in the first and second series of operand.

15. The method according to claim 14, further comprising the steps of:
  receiving a two-dimensional array of image data values;
  computing interpolated image data values using the SIMD instruction.

16. A non-transitory computer-readable storage medium comprising computer-executable instructions that, when executed, cause a programmable instruction processing circuit to execute the method of claim 14, the computer-executable instructions including said SIMD instruction.

* * * * *